Figure 1:
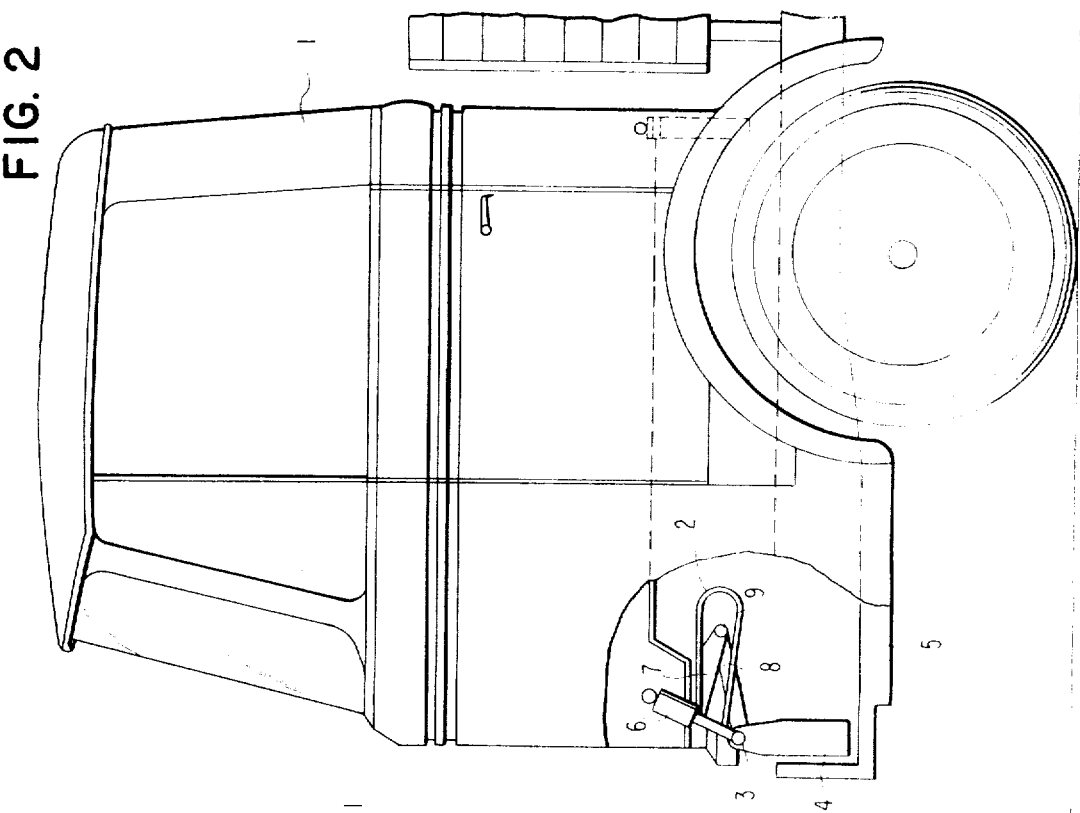

United States Patent

Steiner et al.

[15] 3,667,565
[45] June 6, 1972

[54] DRIVER CAB OF COMMERCIAL-TYPE MOTOR VEHICLES

[72] Inventors: Adolf Steiner, Gerlingen; Hans Rinnergschwentner, Rotenfels, both of Germany

[73] Assignee: Daimler-Benz Aktiengesellschaft, Germany

[22] Filed: May 22, 1970

[21] Appl. No.: 39,764

[30] Foreign Application Priority Data

May 24, 1969 Germany ................ P 19 26 779.9

[52] U.S. Cl. ............... 180/89, 296/35 R, 296/28 C, 280/106.5
[51] Int. Cl. ................................................. B62d 27/04
[58] Field of Search ............ 180/89; 296/35 R, 28 C; 267/57, 25; 280/106.5

[56] References Cited

UNITED STATES PATENTS

| | | | |
|---|---|---|---|
| 3,393,005 | 7/1968 | Herrmann et al. | 296/35 X |
| 1,912,451 | 6/1933 | Hibbard | 296/35 X |
| 3,402,940 | 9/1968 | Castelet | 267/57 X |
| 3,276,476 | 10/1966 | Jackson | 267/31 X |
| 3,123,380 | 3/1964 | Grim et al. | 180/89 X |
| 3,165,351 | 1/1965 | Clancy et al. | 296/65 |
| 2,730,355 | 1/1956 | Katzung | 267/57 X |

FOREIGN PATENTS OR APPLICATIONS

| | | | |
|---|---|---|---|
| 1,033,673 | 7/1953 | France | 296/35 |

*Primary Examiner*—Benjamin Hersh
*Assistant Examiner*—John P. Silverstrim
*Attorney*—Craig, Antonelli & Hill

[57] ABSTRACT

A driver cab for commercial-types of vehicles which is spring-supported with respect to the vehicle frame by spring or guide elements arranged between the vehicle frame and the driver cab on opposite sides of the vehicle; the spring or guide elements are thereby connected with each other by a stabilizer, preferably in the form of a torsion rod.

15 Claims, 2 Drawing Figures

DRIVER CAB OF COMMERCIAL-TYPE MOTOR VEHICLES

The present invention relates to a driver cab of commercial-type vehicles which is spring-supported with respect to the vehicle superstructure, such as the frame or the like.

Driver cabs of commercial-type vehicles are frequently spring-supported relatively softly with respect to the vehicle frame in order to increase the driving comfort and to avoid premature fatigue of the driver and co-driver. However, as with all softly spring-supported vehicle bodies, a strong cross-tilting occurs in connection therewith during curve drives.

The present invention is therefore concerned with the task to avoid with such a softly spring-supported driver cab, an excessively strong cross-tilting during curve drives without large constructive and structural expenditures.

Accordingly, a driver cab of commercial motor vehicles, spring-supported with respect to the vehicle frame, is proposed in which according to the present invention spring- or guide-elements arranged on different sides of the vehicle between the vehicle frame and the driver cab are interconnected by a stabilizer.

Preferably a straight torsion rod is used as stabilizer.

According to a preferred type of construction of the present invention, the driver cab is spring-supported in its forward area by an approximately hairpin-shaped bending spring each and additionally two longitudinal guide members are provided on each side for the guidance of the driver cab which are connected with each other at one end thereof and whose other end is pivotally connected at the driver cab and at the vehicle frame, respectively, whereby the torsion rod is rigidly clamped between two lower or upper longitudinal guide members.

Accordingly, it is an object of the present invention to provide a driver cab of commercial types of vehicles which avoids by simple means the aforementioned shortcomings and drawbacks.

Another object of the present invention resides in a driver cab of commercial-types of motor vehicles which is relatively stable also in curve drives notwithstanding a relatively soft spring-support of the driver cab.

A further object of the present invention resides in a driver cab of commercial-types of vehicles which avoids excessive cross-tilting during curve drives without large expenditures.

Figure 2:
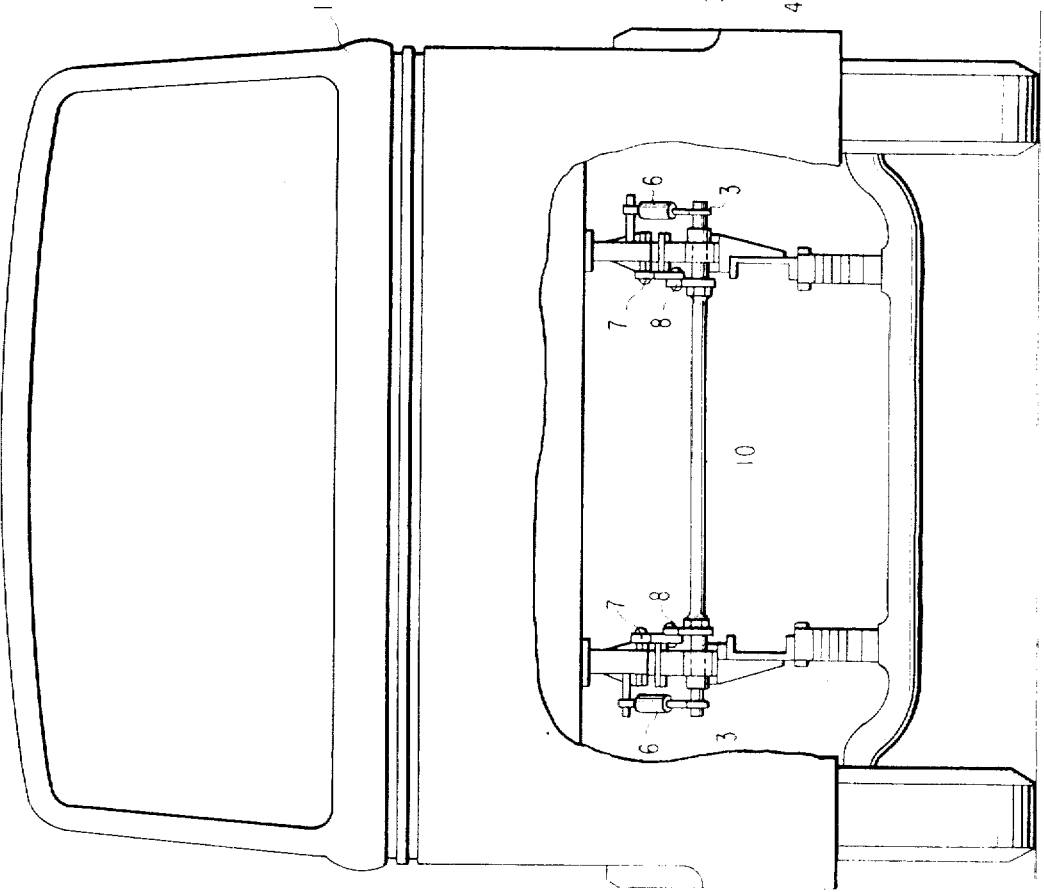

These and other objects, features and advantages of the present invention will become more obvious from the following description when taken in connection with the accompanying drawing which shows, for purposes of illustration only, one embodiment in accordance with the present invention, and wherein:

FIG. 1 is a front elevational view of a driver cab in accordance with the present invention, with the front wall of the driver cab partly broken away, and FIG. 2 is a side elevational view of the driver cab of FIG. 1 with the outer cover panel of the driver cab partially broken away.

Referring now to the drawing wherein like reference numerals are used throughout the two views to designate like parts, the driver cab 1 of the illustrated commercial type motor vehicle is supported at its forward end on two approximately hairpin-shaped springs 2 (FIG. 2). The springs 2 are pivotally mounted in the upper part at the driver cab 1 and in the lower part in pivot bearings 3 at the pivot bearing supports 4. The pivot bearing supports 4 are secured at a relatively fixed part of the vehicle such as the vehicle frame. The spring system is additionally provided with two shock absorbers 6. Longitudinal guide members 7 and 8 are provided for the guidance of the driver cab 1 which are pivotally connected with each other at 9 (FIG. 2). A torsion rod 10 effective as transverse stabilizer extends between the two lower longitudinal guide members 8 which is rigidly connected at its two ends with the longitudinal guide members 8.

While we have shown and described only one embodiment in accordance with the present invention, it is understood that the same is not limited thereto but is susceptible of numerous changes and modifications as known to a person skilled in the art. For example, the arrangement according to the present invention may be used both with fixed as also with tiltable driver cabs. Consequently, we do not wish to be limited to the details shown and described herein, but intend to cover all such changes and modifications as are encompassed by the scope of the appended claims.

We claim:

1. A supporting arrangement for resisting cross-tilting of a driver cab on a commercial type motor vehicle; said arrangement comprising: suspension means arranged at opposite sides of the cab between the cab and a fixed part of the vehicle, each of said suspension means including spring means for cushioning forces transferred from the fixed part to the cab by permitting limited relative vertical movement therebetween, each of said suspension means further including guide means for guiding the relative vertical movement of the cab and the fixed part, and torsion rod means fixed at its ends to the respective guide means at opposite sides of the vehicle, at least one of said guide means including at least one guide member pivotably mounted to at least one of said cab and said fixed part about a substantially transverse axis, at least one of the ends of the torsion rod means being fixed to said at least one guide member, said torsion rod means being only supported at its ends whereby it provides torsional restoring forces to the respective guide means to equalize the relative vertical movements between both sides of the cab and the fixed vehicle part.

2. An arrangement according to claim 1, characterized in that each of the spring means include approximately hairpin-shaped bending springs attached to the forward area of the respective sides of the cab.

3. An arrangement according to claim 1, characterized in that each of said guide means include a first and second guide member pivotally connected with each other at one end thereof, the other end of said first member being pivotally connected at the driver cab, the other end of said second member being pivotally connected at the vehicle fixed part, and in that said torsion rod means is rigidly connected to respective similar guide members at opposite sides of the vehicle.

4. An arrangement according to claim 3, characterized in that each of the spring means include approximately hairpin-shaped bending springs attached to the forward area of the respective sides of the cab.

5. An arrangement according to claim 3, characterized in that said torsion rod means is connected to respective second guide members at opposite sides of the vehicle.

6. An arrangement according to claim 5, characterized in that said torsion rod means is connected to the respective second guide members in the area of the pivotal connections to the vehicle fixed part.

7. An arrangement according to claim 3, characterized in that said torsion rod means is connected to respective first guide members at opposite sides of the vehicle.

8. An arrangement according to claim 1, characterized in that said torsion rod means consists of a single substantially rectilinear torsion rod.

9. An arrangement according to claim 2, characterized in that a shock absorber is arranged on each side of the vehicle within the area where the spring is attached to the cab and vehicle fixed part.

10. An arrangement according to claim 1, characterized in that a shock absorber is arranged on each side of the vehicle within the area where the spring is attached to the cab and vehicle fixed part.

11. An arrangement according to claim 3, characterized in that said torsion rod means consists of a single substantially rectilinear torsion rod.

12. An arrangement according to claim 4, characterized in that said torsion rod means consists of a single torsion rod.

13. An arrangement according to claim 1, characterized in that said torsion rod means consists of a single torsion rod.

14. An arrangement according to claim 6, characterized in that said torsion rod means consists of a single torsion rod.

15. An arrangement according to claim 3, characterized in that each of the spring means includes approximately hairpin-shaped bending springs having one end fixed to the cab adjacent the pivotal connection of said first member and the other end fixed to the fixed vehicle part adjacent the pivotal connection of said second member.

* * * * *